US007536256B2

(12) United States Patent
Kelley et al.

(10) Patent No.: US 7,536,256 B2
(45) Date of Patent: May 19, 2009

(54) AGENDA REPLICATOR SYSTEM AND METHOD FOR TRAVELERS

(75) Inventors: Edward E. Kelley, Wappingers Falls, NY (US); Tijs Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 10/632,296

(22) Filed: Jul. 31, 2003

(65) Prior Publication Data

US 2005/0027442 A1 Feb. 3, 2005

(51) Int. Cl.
*G01C 21/34* (2006.01)

(52) U.S. Cl. ................ 701/202; 701/200; 701/210; 701/35; 701/49; 701/209; 340/990; 340/993; 340/995.12; 705/6; 709/209

(58) Field of Classification Search ............... 701/202, 701/35, 200, 210, 49, 209; 705/6; 709/203; 340/990, 993, 995.12
See application file for complete search history.

(56) References Cited

U.S. PATENT DOCUMENTS 5,859,628 A * 1/1999 Ross et al. ............... 345/173
5,951,620 A * 9/1999 Ahrens et al. ............ 701/200

(Continued)

FOREIGN PATENT DOCUMENTS

WO    WO 00/54170 A2    9/2000

(Continued)

OTHER PUBLICATIONS

SafeTzone Technologies Corporation, "Child Locating System Solution", http://www.safetzone.com.

(Continued)

*Primary Examiner*—Thomas G Black
*Assistant Examiner*—Wae Louie
(74) *Attorney, Agent, or Firm*—Cantor Colburn LLP; Ronald Kaschak

(57) ABSTRACT

In automotive GPS navigation systems, a traveler's agenda with multiple desired destinations can be entered in a largely automatic fashion by downloading an agenda table created using the agenda replicator system and methods disclosed herein. The replicator system includes computer hardware and software systems, operable by a user, to acquire and store, apart from a vehicle and its GPS navigation system, personal travel agenda information for later transfer to a storage subsystem of the vehicle's GPS navigation system. The hardware system may be implemented as a desktop or laptop computer, or even a personal digital assistant. The software system includes program components for controlling the hardware and providing a data structure in which personal travel information selected by the user is placed in an agenda table. The replicator system includes means for transferring the information from this data structure into a storage subsystem of the vehicle's GPS navigation system. In this manner, the agenda replicator system allows an agenda table to be created by the user while in an office or other convenient location, and then be easily transferred to the storage subsystem of the vehicle's navigation system. The disclosed replicator system and methods also allow the user to specify personal preferences in the agenda table. These in turn allow the route-planning subsystem to do a better job of selecting routes to follow when traveling from one destination to the next.

9 Claims, 13 Drawing Sheets

U.S. PATENT DOCUMENTS

| | | | |
|---|---|---|---|
| 5,987,421 A | 11/1999 | Chuang | |
| 6,018,775 A * | 1/2000 | Vossler | 710/1 |
| 6,173,209 B1 | 1/2001 | Laval et al. | |
| 6,300,903 B1 | 10/2001 | Richards et al. | |
| 6,363,320 B1 | 3/2002 | Chou | |
| 6,400,690 B1 | 6/2002 | Liu et al. | 370/252 |
| 6,401,085 B1 | 6/2002 | Gershman et al. | 707/4 |
| 6,424,264 B1 | 7/2002 | Giraldin et al. | |
| 6,490,409 B1 | 12/2002 | Walker | |
| 6,496,806 B1 | 12/2002 | Horwitz et al. | |
| 6,519,530 B2 | 2/2003 | Crockett et al. | |
| 6,526,335 B1 * | 2/2003 | Treyz et al. | 701/1 |
| 6,622,083 B1 * | 9/2003 | Knockeart et al. | 701/202 |
| 6,741,931 B1 * | 5/2004 | Kohut et al. | 701/209 |
| 6,795,835 B2 * | 9/2004 | Ricart et al. | 707/204 |
| 7,283,902 B2 * | 10/2007 | Heider et al. | 701/49 |
| 2002/0082859 A1 | 6/2002 | Lancos et al. | |
| 2002/0082897 A1 | 6/2002 | Menelly et al. | |
| 2005/0027442 A1 * | 2/2005 | Kelley et al. | 701/202 |

FOREIGN PATENT DOCUMENTS

WO     WO 00/54206     9/2000

OTHER PUBLICATIONS

Matt Pillar; "Killer Kiosk Application: Just Add Kids and Water"; Business Solutions; Nov. 2002.

Associated Press; "More than parks looking into surveillance technology since Sep. 11"; MSNBC;11-16.

Associated Press; "Online Media"; Orlando, Fla.

James Bickers; "Eyes in the sky"; KioskMarketplace.com.

Timothy W. Giraldin; "SafeTzone Business Summary"; MacReport; 2003; macreport.net.

Lo-Q pic; "Products"; http://www.lo-q.com/products.htm;2003.

Lo-Q pic; "Product Summary"; http://www.lo-q.com/summary.htm; 2003.

Lo-Q pic; "Out of Line"; http://www.lo-q.com/newsletter.htm; Nov. 2002, Apr. 2003.

\* cited by examiner

| GPS Agenda Table 200 | | | |
|---|---|---|---|
| Agenda Item 210 | Dynamic Time to Destination 230 | Route Description | 240 |
| Agenda 1 221 | Time 1 231 | Route 1 | 241 |
| Agenda 2 222 | Time 2 232 | Route 2 | 242 |
| Agenda 3 223 | Time 3 233 | Route 3 | 243 |
| Agenda 4 224 | Time 4 234 | Route 4 | 244 |
| Agenda 5 225 | Time 5 235 | Route 5 | 245 |
| Agenda 6 226 | Time 6 236 | Route 6 | 246 |
| Agenda 7 227 | Time 7 237 | Route 7 | 247 |

FIG. 2

AGENDA REPLICATOR SYSTEM AND METHOD FOR TRAVELERS

BACKGROUND OF THE INVENTION

1. Field of the Invention

The present invention relates in general to systems and methods for users to plan and input itineraries and travel agendas into GPS-based automatic positional or navigation systems for automotive vehicles, and in particular to systems and methods for developing and storing on an office computer or personal computer itinerary and related travel agenda information and then replicating that information by transferring it to a vehicle-based GPS navigation system, thereby helping the busy traveler/car driver.

2. Discussion

Users of an automotive vehicle positioning systems, for instance a GPS navigation system used in conventional automotive vehicles, typically must manually input information about the user's destination, such as the street address of the destination, into the positioning system in order to have the positioning system determine routing information for the user. The manual entry of such customized information is time-consuming and a major drawback of such systems.

Some users of such automotive vehicle positioning systems, like sales and service personnel who are on the road, may stop at a several different locations before returning to their office or other starting/ending point of the trip. It is time-consuming and burdensome for a user to enter extensive information into a positioning system when traveling, or making plans to travel, to several different locations in sequence.

In currently-available positioning systems, the effort required of the user to obtain routing information can be lessened by selecting the destination with the aid of a system which allows the user to manually input a several letter code into the system. The location information associated with the code, consisting of only a few letters, has already been entered into the system by the system's manufacturer and suggests the most likely city and address which the user might need. Even with such an abbreviation or code-based system, considerable time and effort from the user may be required in the vehicle in order to initially input the relevant city and street addresses. Also, the entry of information is more difficult and problematic when the vehicle is in motion.

Generally, there are at least a few ways to get from a starting point to most destinations. Some of the currently-available positioning systems can generate alterative routes from the starting location to the user's destination location. This is due in part to those systems being loaded with extensive street and detailed map information on DVDs or other mass-storage devices available for such systems. However, the systems generally do not provide any information that might help the user decide or select which alternative route to choose, based upon a particular user's needs or preferences.

An important variable that influences the choice of route is the desired time of arrival at the user's destination. Current user-directed land-based vehicle navigation systems of which we are aware do not provide for the entry of the time of arrival as a variable to be used in selecting the route.

Besides desired time of arrival, we have recognized that there may be other factors which may influence a user when manually planning a route to choose one route over other alternative routes. Currently available positioning systems of which we are aware do not take such user preferences into account when planning or selecting routes for the user.

Some of the most regular users of vehicle navigation systems, such as sales and service personnel, may need to travel to a sequence of locations during a given day or trip. Some current user-based routing systems allow for the entry of different destinations in sequence. However, while en route, a call from the boss or an important client or prospective customer may cause such a traveler to change his or her originally planned itinerary or travel agenda for the day or trip. Therefore, such users need flexible routing capabilities, but we are unaware of the vehicle-based GPS navigation systems having the flexibility to easily add or delete or rearrange the order of a list of planned destinations, once a sequence of destinations has been entered, particularly with regard to destinations other than perhaps the last one on the list.

Users of vehicle navigation systems involved in sales or in providing services to customers frequently spend time at their own offices, or their customer's offices, shops, homes or other locations, making and confirming plans relative to their next stop or two or three. Such users often will sit at their own offices or some other base station and make phone calls to various clients or customers. When at their desks, they typically have available to them various sources of information to assist in the planning of an itinerary or a route that are not available as part of a vehicle-based navigation system. They may also have one or more staff members or assistants to help them locate needed addresses or contact people. They likely may have available a desk-top computer, a lap-top computer and/or a hand-held computer such as a personal digital assistant (PDA). These computers and portable devices often have much easier-to-use input devices and/or more convenient methods of entering data into them than does the typical automotive GPS navigation system of which we are aware. In addition, there is other helpful information on these traditional office computers or devices such as an electronic calendar, an electronic memo file, and an address book that might well assist in the route or itinerary planning process. Examples of combined personal information management and e-mail communication systems having such features include, but are not limited to, Lotus Notes, Corel Central, Microsoft Outlook and at least certain models of the Blackberry and Palm brands of PDAs.

To summarize, we have recognized that in one's office, there are many types of other useful reference materials on the Internet or on a personal task list or memo file that might be helpful in planning a route, such as databases containing names, addresses and phone numbers for businesses, maps of cellular phone coverage and other types of information. Currently, there is no way we know of for readily duplicating or transferring needed information, including but not limited to addresses and itineraries, which likely resides on one or more desktop or laptop computers or handheld PDA devices, relative to planning routes or itineraries, so that this useful information becomes readily available on an automotive vehicle navigation system.

SUMMARY OF THE INVENTION

In light of the foregoing limitations associated with the known vehicle-based itinerary and/or agenda planning systems and methods, as part of the present invention, we have recognized that there is a better way to facilitate itinerary and route planning within the office or other non-vehicle locations, and then to make that itinerary and route planning information more readily available when on the road. We have also recognized that there is a need to be able to transfer the customized information that the average sales or service person who is on the road tends to collect in paper and/or electronic form and make it more readily available to that person through his or her electronic GPS-based navigation systems and related car information systems. The customized information useful to sales and service personnel and to others who regularly travel by car or truck includes the information from address books, appointment calendars, memo files and things-to-do lists. Often times, this information is nowadays captured in electronic address books, calendars and the like, and may be available on the user's desktop or laptop in a personal information management software package or in the user's PDA.

Also as part of the present invention, we have recognized that this information, along with information pertinent to planning the itineraries, can be captured or organized in electronic files, tables or data structures usable in vehicle-based GPS navigation systems, and then transferred thereto, or to suitable storage memory subsystems in an automotive vehicle that is connected to the vehicle's GPS navigation system. Preferably, those storage memory subsystems are provided with suitable data structures or databases for holding and accessing the transferred information. In this manner, using the user interface input devices and the visual display provided on modem vehicle-based GPS navigation systems, that information can be accessed while in the vehicle, even if one does not have his or her laptop or PDA handy in the vehicle. Further, we have recognized that user-preferences and other user-customized information can be incorporated into and made part of the route-planning process, particularly when multiple stops are envisioned, and that all of the foregoing information can be used both outside of the vehicle and within the vehicle to plan travel agendas and itineraries.

In light of the foregoing recognitions, we have devised the computerized systems and methods of the present invention for collecting such information in useful form, such as an agenda table (or any other suitable database) in a separate "agenda replicator" system outside of a vehicle, which system is separate and apart from a vehicle-based navigational system. This replicator system also allows the collected information in the agenda table and/or other data structures to be viewed by the user in order to check it for accuracy, among other things, and modify it as desired. The replicator system importantly also has the ability to then transfer in an automated fashion that collected information upon user command to a vehicle-based navigational system or the storage subsystem associated therewith. Also, as part of the systems and methods of the present invention, with suitable agenda-planning and trip-planning software, we have are able to plan multiple-destination agendas or itineraries in such an agenda replicator system outside of a vehicle and apart from its vehicle-based navigational system. Then, using the agenda replicator system and method, we are able to transfer the data representing the prepared itinerary or other personalized agenda information from that replicator system into the vehicle-based navigational system, where it can be put to effective use. In this manner, the agenda replicator systems and methods of the present invention save time and facilitate on-the-go planning, since, as will be seen, an agenda can be readily changed and updated even in the middle of a multiple-stop road trip.

In light of the foregoing limitations of the agenda planning capabilities of vehicle-based navigation systems of which we are aware, and to implement the enhanced agenda-planning features mentioned above, there is provided, in accordance with one aspect of the present invention, a novel agenda replicator system for use by travelers in connection with a computerized GPS navigation system of the type installed on an automotive on-road vehicle. Specifically, such a navigation system preferably has a storage subsystem for storing at least a plurality of user-selected addresses intended as an agenda to be traveled with the assistance of the GPS navigation system. Such a navigation system also preferably has route-planning and route-monitoring subsystems for assisting with a vehicle user with the navigational tasks relative to traveling to such selected addresses. The present invention provides, for selective use within this environment, a computerized agenda replicator system, operable by the regular user(s) of the on-road vehicle, for transferring personalized travel agenda information developed with such a replicator system while away from the on-road vehicle, into the vehicle's storage subsystem, so that it can be used by and with the GPS navigation system.

Our agenda replicator system may be comprised of a first computer system, operable by a user to acquire and store, a part from any vehicle and any GPS navigation system therein, personal travel agenda information in an agenda table for later transfer to a storage subsystem of a GPS navigation system. The first computer system, which normally has one or more processors, preferably includes the following hardware elements: a first memory for holding at least first and second program components; a second memory for storing selected personalized agenda information; and a visual display unit for viewing at least some of the personalized agenda information stored in the second memory. The hardware elements also include data entry means operable by the user for selectively entering into the first computer system data constituting personal travel agenda information, and data transfer means for automatically transferring data constituting personal travel agenda information stored in the first computer system to an input portal connectable to a storage subsystem of the GPS navigation system.

The first computer system preferably has the following software elements: a first program component for providing a data structure for holding within the second memory, personal travel agenda information selected by a user and including at least a plurality of destinations; and a second program component for providing, upon user command, a transfer of personal travel agenda information under the processor control from the second memory through the first data transfer means to the storage subsystem of the GPS navigation system. The data structure used for storing the information for the agenda table is preferably of the type that is arranged to be loaded, under processor control, at least in part with data from the data entry means. With this combination of elements, the first computer system is operable to transfer personal travel agenda information including at least a plurality of destinations stored therein to a storage subsystem of the vehicle-based navigation system.

There is also provided, in accordance with the present invention, a method for transferring personal travel agenda information from a first computer system to an automotive vehicle-based computer system with GPS navigation capabilities and with route-planning capabilities. The method allows the transfer to take place in an automated fashion. The personal travel agenda information specifies destinations and related personal route-planning user preferences. The first computer system may be implemented as a desktop or laptop computer or as a personal digital assistant (PDA) which is distinct and physically separate from an automotive vehicle and its GPS navigation system. This method of the present invention preferably has the following steps: (a) Providing a first computer system with a first memory for storage of personal travel agenda information to be used in an agenda table for specifying at least first and second desired destinations, sequence information relative to the destinations, and at least a first item of personal preference information associated with each desired destination. (b) Loading into a first memory information for specifying at least first desired destination. (Typically a plurality of desired destinations will be loaded into the first memory.) (c) Loading into the first memory at least a first unit of personal preference information associated with the first desired destination. (In practice, multiple personal preferences may be loaded into the first memory.)

Further steps of the method of the present invention include: (d) Checking the information loaded in steps (b) and (c) for accuracy via a display associated with the first computer system; (e) Establishing a first communications path between the first computer system and a first storage subsystem associated with a vehicle based GPS navigation system, whereby digitized information may be transferred across such communications path. (f) Downloading into the first storage subsystem of the GPS navigation system personal agenda information that was based upon the information loaded into the first memory as part of steps (b) and (c). Optionally, the method may further comprise the following steps: (g) updating a travel agenda table in the GPS navigation system with at least part of the personal agenda information downloaded in step (f); and (h) instructing the GPS navigation system to perform route-planning for reaching the first desired destination in the information downloaded from the first computer system.

In an exemplary embodiment of the present invention, the agenda table may contain one or more agenda items, e.g., desired destinations, the estimated time it will take the user to travel to each agenda item along the planned route, and the route information (e.g., individual roads selected and directions to follow) which the positioning system has generated. An agenda item is a descriptor that identifies the location to which the user needs directions. The descriptor may be almost any type of word, abbreviation, picture or symbol (including the name of a person or company to be visited at the desired destination) that identifies with sufficient uniqueness the address of the desired destination to which the user is traveling. If the desired time of arrival is entered, then the route-planning subsystem should generate a route that allows the user to arrive at his or her destination on or before that time and preferably without exceeding posted speed limits on the roads of the specified route.

Factors such as readily described road conditions or other attributes associated with travel on certain roads that would influence a user to choose one route over another are described herein as personal travel preferences. For instance, if the user intends to spend most of his or her time on the road making or receiving phone calls with a cellular phone, the availability of adequate cell phone coverage over the entire route might be a significant factor influencing the choice of a driving route. If the user wishes to minimize the amount of fuel consumed, then fuel consumption required by the alternative routes would be a significant factor. If the user wishes to avoid unpleasant driving conditions, such as congested roads, construction zones, areas prone to excessive snow in the winter, areas prone to flooding in heavy rain, or other adverse road conditions including on-going construction zones, then such conditions are factors that may possibly be as user preferences in systems and methods of the present invention. The availability of places of interest to the user along a route could also be considered a preference. Such places could include, for example, restaurants, gas stations, historic or scenic sites, and various types of stores or facilities at which the user may need or may possibly wish to stop. To the extent that any of these conditions and factors can be associated with roads, streets and highways through databases or other computer resources, which can be accessed and/or interrogated while on line or through stored databases, then this information can be used by route planning subsystems to optimize planned routes and/or estimated time of arrival calculations. According to one aspect of our invention, these preferences are to be specified as factors in the agenda table, so that they will be considered as appropriate by the agenda replicator system, and by vehicle-based GPS navigation system, and any route planning subsystem used in either system. Specifically, these factors may be specified by the user thereof so that his or her preferences are employed as an integral part of route planning and/or estimated time of arrival calculations, as will be further explained.

It would be helpful for a route-planning subsystem of the GPS navigation system to be able to automatically compute routes if the user decided not to stop at one of the locations in an agenda table at which the user earlier planned to stop. This is another aspect of our invention. Accordingly, our systems and methods may be arranged to operate as follows. When a location is dropped from the user's itinerary as specified in a travel agenda table, then, the agenda replicator system of the present invention updates the starting point for the trip to the next location changes. Accordingly, the systems of the present invention may be arranged to automatically recalculate the route information, based upon the updated information, including the dropped agenda item and/or a new current starting point location of the vehicle. In this manner, the user does not have to reenter information about the other following destinations. Instead, the system upon being prompted helps this process by automatically updating the agenda tables and re-generates any routes previously planned that are affected by the changes, as will be further explained. These and other aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIG. 2 is a diagram of one possible structure for a travel agenda table to be used by the FIG. 1 system of the present invention.

—FIGS. 5 and 6 illustrate how the process software implementing the systems and methods of the present invention may be integrated into client, server and network environments;

FIGS. 7 and 8 illustrate several ways in which the process software of the present invention may be semi-automatically or automatically deployed across various networks and onto server, client (user), and proxy computers;

FIGS. 9, 10 and 11 illustrate how process software for implementing the systems and methods of the present invention deployed through the installation and use of two different forms of a virtual private network (VPN); and FIGS. 12 and 13 illustrate how the process software for implementing the systems and methods of the present invention can be deployed through an On Demand business model, which allows the process software to be shared and simultaneously service multiple customers in a flexible, automated fashion under a pay-for-what-you-use plan.

DESCRIPTION OF THE PREFERRED EMBODIMENTS

Figure 1:
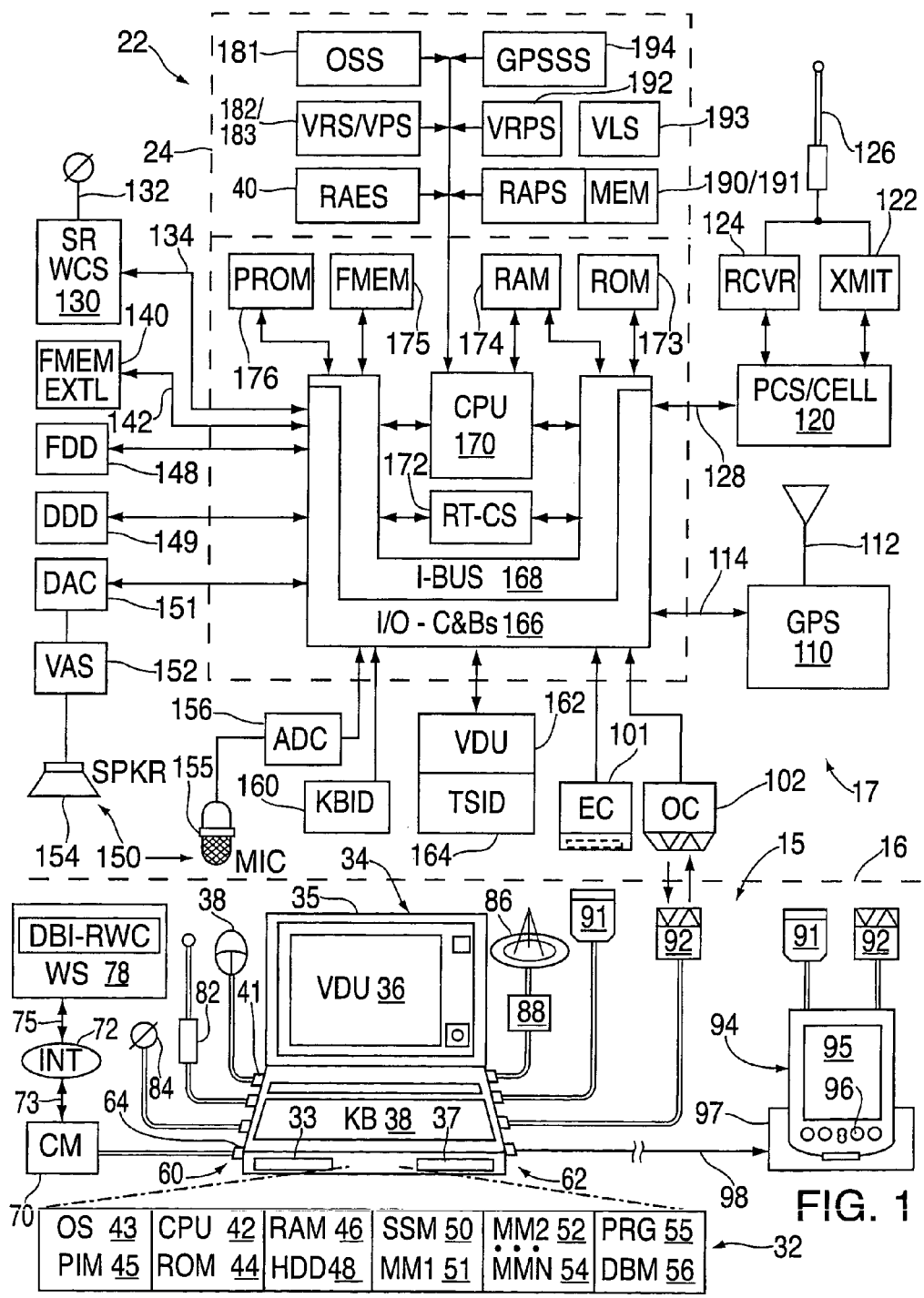
FIG. 1 is a detailed block diagram that depicts various elements of a conventional vehicle-based GPS navigation system, along with an exemplary laptop computer system with various additional hardware and software components added thereto to form the agenda replicator system of the present invention, which replicator system may be used with the illustrated vehicle-based navigation system to practice the methods of the present invention.

The present invention is illustrated and described herein in connection with certain illustrative embodiments, with the understanding that the teachings of the present disclosure are considered to be exemplifications of the principles of the invention and the associated functional specifications required for implementation of the present invention and its several facets. However, it should be appreciated that the systems and methods of the present invention may be implemented in still different configurations and forms, and that other variations thereof are possible, based on the teachings herein.

To better understand various aspects of the systems and methods of the present invention, it is useful to discuss briefly the subsystems and capabilities of known GPS navigation systems in use on automotive vehicles or proposed for use in on automotive vehicles by earlier patents and/or publications. Today's vehicle-based GPS navigation systems are rather sophisticated dedicated computer systems with a few specific subsystems. The global positioning satellite systems are well-known and in wide use in a variety of applications, and have proven very popular for vehicle positioning and vehicle navigation systems for automotive vehicles. By the term "automotive vehicle" as used herein (including in the claims) we mean a land vehicle specifically designed for use on roads and highways, such as cars, vans, sport utility vehicles, trucks, buses and motorcycles. The details of the operation of GPS navigation systems for automotive vehicles are well-understood and need not be discussed herein, except to briefly review some of their major subsystems by way of introduction to certain aspects of and purposes for and/or use of the agenda replicator systems and methods of the present invention.

Vehicle-based GPS navigation systems for automotive vehicles are rather sophisticated application-specific computer systems and typically having a few specific subsystems, each performing some task or series of tasks. First, there is a GPS position-sensing system which allows a vehicle's current location to be determined to within about one to a few meters, on a very regular basis, based upon received GPS signals from orbiting global positioning satellites and information derived and calculations made therefrom. Second, there may be a heading and speed subsystem which calculates direction and/or relative speed. Third, there may be a GPS coordinate-versus-location database system where known GPS coordinates for many streets, highways and roads, and intersections of same are stored at regular intervals, and the location of the vehicle and/or addresses can be looked up from stored information and/or derived by interpolation from GPS coordinates stored in the database system. The storage for this kind of database system may be employ solid-state memory and/or CD-ROMs, DVDs or other suitable mass memory devices for storing and/or accessing this location information.

Fourth, there may be a route-finding subsystem, that, given the current vehicle position and direction and very recent historical data points for same, and given the GPS coordinate vs. location database, is able to determine a vehicle's estimated current position relative to a detailed road map of the area in which the vehicle is currently traveling. Fifth, there may be a route-generating system, which is capable of creating suggested routes to go from one location (point A) to another location (point B) using known streets, roads and highways in its database. Sixth, there normally is a visual display system for projecting images, such as maps and selected routes thereon often in superimposed fashion, in order to show the area over which the vehicle is to travel and/or is traveling, and/or for projecting a text list of detailed road directions to be followed in order to go from Point A to Point B.

FIG. 1 is a simplified system block diagram of an archetypical computer hardware and software environment in which the agenda replicator systems and methods of the present invention may be used to advantage. FIG. 1 is divided into lower and upper portions 15 and 17 by horizontal dashed line 16. In lower portion 15, all or most of a typical agenda replicator system 30 is illustrated. (Whether it is all or most depends upon whether or not optional components or elements thereof, which will be described, are considered to be part of the system). In upper portion 17, a typical vehicle-based GPS navigation system 22 with its own internal computer system 24 is shown, with various optional communications links and software components of the present invention added thereto to give it a unique functionality. Systems 22 and 32 can communicate with one another on a continuous or selective basis as desired through one or more communication links, which will also be further described below. First, computer system 32 and its various communications capabilities, links and connectors will be described in detail, followed by a similar description of navigation system 22 and its computer system 24.

As previously noted, most, if not all, of the agenda replicator system 30 preferably resides primarily upon the representative computer system 32. In FIG. 1, system 32 is visually depicted as a generic laptop or notebook computer, for convenience of illustration. In practice, system 32 may alternatively be an office computer, such as desktop computer system, a workstation computer or part of a network computer or server computer. It may also be part of a distributed computer system, such as a Citrix system, where applications being run or executing reside mostly or entirely on a remote computer workstation or server, while the user accesses the same through a local user terminal (that may be a dumb terminal or regular desktop computer). Such terminals have visual display and appropriate data input, display and selection devices (e.g., a keyboard, mouse, touch screen). As should be well-understood, it generally is the specialized software-based programs loaded into any given general-purpose personal or business computer that transforms such computer systems, at least with respect to the relevant application(s), into a special-purpose computing machine with unique functionality. This is the case with the agenda replicator system of the present invention from at least a high-level perspective. However, various aspects of the replicator system 30 of the present invention do relate in part to hardware elements, since this is an invention based upon a combination of elements, features and/or steps.

As illustrated in FIG. 1, various communications links shown both below and above dashed line 16, and various hardware/software components which may be part of or installed upon the GPS navigation system 32, which and they may also form part of certain embodiments of the systems of the present invention, all of which is further explained in this disclosure. After the following introductory detailed discussion of components or elements, both hardware and software, shown in FIG. 1, more specific aspects and functionality of the systems and methods of the present invention, will be discussed thereafter, and should be more easily understood.

In the lower portion 15 of FIG. 1, the office computer system 32, a computer hardware system 34 is shown in a conventional two-piece center-hinged hard-shelled enclosure 35. Hardware system 34 includes a visual display unit 36 (which may be a flat screen liquid crystal display or plasma display or any other known or suitable display) and a keyboard 38. System 34 may also have a CD/DVD disk drive 33, and an optional floppy disk drive 37. It may include a pointing device such as mouse 38 connected by wire or optical link to the motherboard of system 34 in the bottom half of enclosure 35.

System 34 may also have one or more of the following, typically internal components, which are schematically shown in enlarged box 40 that represents the insides of system 34 shown at the bottom of FIG. 1: central processing unit (CPU) 42; operating system (OS) 43, read-only memory (ROM) 44; personal information management software package (PIM) 45 (with electronic calendar and address book); random access memory (RAM) 46; and main storage in the form of a hard disk drive (HDD) 48 and/or solid-state memory (SSM) 50 or the like. These memories may be appropriately partitioned or otherwise segmented via hardware or software into individual memory sections such as a first mass memory (MM1) 51, a second mass memory 52 through Nth mass memories (MMN) 54, as needed. The particular form or division of these memories is not believed at this time to be important to the present invention as long as they in combination with the internal buses and cache and CPUs are large enough and reasonably fast to allow for the necessary storage, processing and accesses to memory to occur without too much delay.

As will be further explained, certain software components, typically provided in the form of program components (PRG) 55, and database management (DBM) programs 56 (which may also be called components, objects, modules or routines) are associated with and stored on a permanent or temporary basis therein. (Broadly speaking, the program that manages, controls and updates the travel agenda table may be considered a DBM program.)

The computer system 32 also includes, as desired, suitable electronic and/or optical interface cards and cable/connectors 60 and 62, such as network card and cable 64, mouse connector 66 and other cables/connectors shown therebetween on left and right sides of the lower half of enclosure 35. These are standard interface cards and cable/connectors, which may be purchased as off-the-shelf components, and thus need not be further described. Also shown in bottom portion 15 is cable modem 70 which connects to the Internet (INT) represented by an oval 72. Suitable bidirectional communications paths 73 and 75 provide digital access to an archetypical Internet web site (WS) 78, through which database information (DBI) on an almost limitless variety may be obtained. In regard to the systems and methods of the present invention, database information about roads (R), weather conditions (W.) and cell phone coverage (C), as they relate to on-the-road automotive travel situations and related conditions or items of interest while traveling may be obtained from such websites.

As is well-known, information in digital electronic form is available from the Internet via public information sources and private paid-subscription commercial database services about many different types of information relating to roads. As the on-line digital revolution progresses, we expect that increasingly greater and more varied amounts of road-related information and conditions and allied subjects useful to advanced GPS navigation systems for travelers will become available. We fully expect that such information can be used to advantage by automotive travelers who use the systems and methods of the present invention. In the discussion herein, the term "roads" is a generic reference to all forms of public thoroughfares, including streets, byways, boulevards, business routes, bypasses, country roads, highways, expressways, free roads, toll roads, and everything in between, designed for on-road automotive vehicle travel. Either presently or in the future we expect that virtually all roads will show up on commercially available detailed maps and databases for automotive vehicle-based GPS positioning systems including but not limited to navigation systems. "Road information" available now or in the future from public and private databases and web sites and commercial services (collectively called "on-line information sources") may include but is not limited to construction zones, temporary closings, and/or temporary bottlenecks and/or alternate routes due to construction, congestion, special events, traffic conditions and/or accidents.

Similarly, "weather condition information" available now or in the future from on-line information sources we expect to include but not be limited to conditions, reports and predictions about rain, fog, flooding, snow, high winds and extreme temperatures. Similarly, the term "cell phone coverage" available from such sources may include but not be limited to the geographical extent and quality of coverage for the wireless systems of different commercial mobile phone/cell phone carriers, whether based upon digital service, analog service, RF service and/or satellite service.

Computer systems 22 and 32 have, or may be provided with other ways to communicate with each other and with websites, cell phones, and still other computerized devices including the Internet via wireless communications. These range from cell phone communications systems, to long-range wireless communications systems, to satellite systems (such as Hughes, DirectTV, SkyNet, OnStar, etc. satellite network services), all of which can provide access to the Internet or still other communications avenues to reach on-line information sources.

With regard to computer system 32, these communications links are represented by the following: cell phone antenna 82 (for digital and/or analog mobile phone service); short-range antenna 84 (for short-range wireless connections such as Bluetooth), and a satellite dish 86 connected through a satellite transceiver modem 88, to represent the connection to wireless satellite service. Alternatively, conventional low-voltage electrical connectors with male plug portion 91 and female plug portion 101 may be used to establish a communications link in a well-known manner between computer system 32 and computer system 24 of the GPS navigation system 22. As another option, optical communications links may be established through a pair of short-range optical infrared transceivers 92 and 102. Both ends of communications cable 98 have connectors in order to allow computer system 34 to communicate and exchange digital data with personal digital assistant (PDA) 94. This PDA includes a small visual display/touch sensitive screen 95 that can be written on with a suitable stylus (not shown) and a button set 96. PDA 94 is shown sitting upon its docking station 97 to which cable 98 is connected. Electrical connector 91 and optical connector 92 shown above are connected to PDA 94 and illustrate that PDA 94 may be connected to GPS computer system 22 via conventional selectively connectable electrical connectors 91 and 101 or optical path connectors 92 and 102 as needed.

Many modem PDAs have sufficiently powerful computer processors and sufficiently large memories within in order to be able to serve as miniature size but full-service portable laptop computers. In this regard, a growing number of models of PDAs can now be connected directly to the Internet, either through a physical wiring connection or through a short-range (e.g., Bluetooth) wireless connection or a longer range digital cellular phone connection. Moreover, virtually all of the input/output devices shown in connection with laptop computer 34 may also be used on optional basis with PDA 94. Similarly, many PDAs now have substantial memory capacities, thanks to removable static or nonvolatile digital memories, such as flash memory, SD (secure digital) memory, and the like. In addition, PDAs have display screens and a variety of input devices to allow users to make selections based upon indicators or boxes, etc. shown on the display screens.

In light of foregoing, a typical user of the agenda replicator system of the present invention may choose to install the agenda replicator system software on a desktop computer in an office or shop, or on a portable laptop computer, or on lightweight, very portable, reasonably powerful PDA. All three of these computer devices are able to readily communicate with most GPS navigation systems, such as system 22 shown in FIG. 1, through one or more of the communications paths described principally thus far in connection with computer system 34. As will be seen from the discussion below, complementary input/output devices and communication links are provided in system 22 to allow it to communicate to over one or more communications paths already discussed with regard to system 34.

The various subsystems and components of the GPS navigational system 22 and its associated computer system 24 shown in the upper part 17 of FIG. 1 will now be discussed in detail. GPS positional system 110 has a suitable antenna 112 and provides current GPS position information for its vehicle via communications path 114 to computer system 24. Directly above antenna 112 is shown a personal communications system (PCS)/cellular phone (CELL) system 120 including transmitter (XMIT) circuitry 122 and receiver (RCVR) circuitry 124 and cellular antenna structure 126. Digital information from the cell phone system 120 is communicated over path 128 to computer system 24.

On the upper left side of FIG. 1 is shown short-range wireless communications system 130 including antenna 132 for communicating digital information over communications paths 134 to and from computer system 24. If desired, GPS system 22 may be provided with external flash memory 140 which communicates over path 142 with computer system 24. External memory 140 may if desired be removable by providing a suitable connector and associated memory slot. The use of removable flash memory or other removable memory represents yet another way of transferring information between computer system 34 and computer system 24. For example, a travel agenda table may be loaded into an external memory stuffed in removable memory slot on system 34, and an agenda table produced by the system of the present invention is downloaded thereto. Thereafter, the same external memory unit is removed from system 34 and placed in a memory slot, such as the slot for memory 140. Thereafter, computer system 24 may access that memory and download or view the agenda table and/or other travel-related information (including but not limited to destination addresses, phone numbers and still other contact and calendar information) which has been written thereto by system 34.

Essentially the same procedure can be carried out by use of a suitable removable magnetic or optical disk, whether that disk is a zip disk, floppy disk, compact disc or any other suitable writable disk, including writable optical disks, such as a write-once-read many times (WORM) disk. All that is required are suitable drives in both the computer systems 24 and 34, and the ability to write in read to the removable disks inserted in such drives. In other words, the removable disk can be transferred between a disk drive of the agenda replicator system 32 and a corresponding disk drive of computer system 24 in the vehicle in which navigation system 22 is located. This represents yet another way to transfer agenda table information as well as other valuable information between the office-based system 32 and the vehicle-based system 22 or 24. Note that with the system, as with the other systems, agenda table information may be sent from system 34 to system 24 or from system 24 to system 34. This by directional functionality may not be required, but could be useful in those situations where a user of the vehicle loaded agenda table information or other information into the memory subsystem of the navigation system 22, and now wish to transfer it over to the non-vehicle computer system 24.

The left side of FIG. 1 also shows that computer system 24 may include a floppy disk drive (FDD) 148, and/or a CD/DVD disk drive (DDD) 149, which may be read only if desired for may also be a read/write disk drive. Also shown is a vehicle audio system 150, which includes a digital-to-audio (DAC) converter 151 driven by an output port of computer 24, a vehicle audio amplifier system (VAS) 152, and an audio speaker 54, connected as shown. Audio system 150 also includes a microphone (MIC) 155 and an analog-to-digital converter 156 whose output is connected to a suitable input port of computer system 24. This audio system may be used as an interface between computer system 24 and the vehicle driver (or vehicle passenger), and with a sufficiently intelligent voice-activated and voice-driven interface, may be used in lieu of or in addition to traditional visual displays and tactile input devices, as mentioned elsewhere in this disclosure.

The vehicle-based computer system 24 also includes conventional user keyboard input devices (KBID) 160, which may optionally include a joystick, rollerball or stylus/pointer in order to navigate around selections on a visual display screen. A visual display unit 162 is also provided, and it may be separate from or integrated with a touch sensitive input device (TSID) 164. One example of an integrated device of this type is a transparent touch screen overlaid on a LCD or plasma display. One example of a separate device is a electronic notepad which senses strokes of a stylus or light pen. As previously noted, electrical connector 101 and optical connector 102 complete the family of external devices which are connected to the conventional input/output circuits and buffers (I/O-C&Bs) 166 of computer system 24, which in turn are connected to one or more internal buses within system 24.

Internally, computer system 24 includes a central processing unit (CPU) 170 and if desired, a real-time clock system (RT-CS) 172, in order to provide accurate time keeping for speed in distance measurements and calculations among other things. System 24 also includes read-only memory (ROM) 173, random access memory (174), and optionally internal flash memory (FMEM) 175 and/or programmable read-only memory (PROM) 176. Further, as shown inside of the left upper corner of the dotted box of FIG. 1, computer system 24 may have various kinds of software loaded into a suitable form of memory. The software of computer system 24 includes: operating system software (OSS) 181, optional voice recognition system (VRS) software 182, optional voice production system software 183, and optional route agenda execution software (RAES) 184.

As shown in inside the upper right hand corner of FIG. 1 dotted box, computer system 24 may also includes route agenda planning software (RAPS) 190 with associated optional memory (MEM) 191, vehicle route planning software (VRPS) 192, vehicle locating software (VLS) 193, and the GPS (navigation) system supervisor software (GPSSS) 194, for managing and coordinating the operation of the other system 22 software components and subsystems. The operation of the route agenda planning software 190 is described in further detail below.

Although the description is with respect to an office-based computer system for the most part, it should be appreciated that the advanced features disclosed as part of this invention for use with the office computer system 34 can also be employed in the computer system 24 to advantage. One such feature is the ability to update entries and change entries anywhere in the agenda table. The optional memory 191 may be used as part of the vehicle storage subsystem and if desired the agenda table may be stored therein.

As can be seen from the foregoing description, the possibility of multiple communication links exist between computer systems 24 and 34. This in turn provides several different ways to take an agenda table and related information (including a calendar information and electronic address book information not necessarily used in a particular agenda table) that has been gathered, stored and/or updated on one of the computer systems 34 or 24 and then transfer it over to (by copying or cutting and pasting) to the other computer system 24 or 34, or perhaps a different computer system altogether. For example, if two vehicles were being taken to the same destination, and each had a GPS navigation system 22 of the type described in FIG. 1, the computer system 24 in those two different vehicles could be loaded with identical information, so that two vehicles could travel substantially the same routes and visit the same destinations, even though the two automotive vehicles might get separated in traffic or otherwise not be traveling in lockstep fashion together between the different destination points. Conversely, information from the vehicle-based GPS navigation system 22 from a single vehicle could be transferred to two computer systems 34. For example, a salesperson could take information from his or her vehicle GPS system equipped with the agenda replicator system of the present invention, and transfer agenda table information or other related travel information generated on the road in system 22 to both an office computer system 34 and a substantially similar home computer system 34', both of which may be equipped with agenda replicator systems of the present invention. The systems and methods of the present invention have still further uses which will be described below and/or become apparent from the total description of the systems and methods in this disclosure.

The Use of Preferences in Route-Planning.

Time-of-Arrival Preferences. At certain times, the most important consideration in planning a route is the time by which the traveler must arrive at a certain destination. Generally, a business traveler has an appointment with another party that is set for a particular time. The route to be taken must be a route that allows the traveler to arrive at his destination prior to the time of the appointment. Accordingly, the time by which a traveler needs to arrive at a destination can be used as one of the parameters for route planning.

In addition to the desired time of arrival at a destination, other factors may influence the desired route to be taken by a traveler in traveling to a specific destination. These factors may change depending upon a host of things known to the individual traveler and what needs to be accomplished. Some of the more important other preferences for modem travelers will now be briefly discussed, followed by an explanation of how these preferences may be integrated with systems and methods of the present invention.

Cell-Phone Coverage Preferences. For example, it is well known that cell phone coverage is poor in outlying rural areas and away from major highways. So, when the traveler departs from the well-traveled expressways and enters rural areas, he or she is at risk of losing cell phone coverage. Accordingly, for the traveler who needs to be able to communicate by cell phone while driving (by taking routes where cell phone coverage is substantially complete), specifying this factor may well be very important. It may even be the predominant concern to the traveler who had to participate in an important conference call while en route. Presently, detailed maps are available on the Internet showing cell phone coverage for the six different major carriers within the United States. Such map information is available in some instances with GPS coordinates. The availability of cell phone coverage across the United States and in other countries in such a format (i.e., with GPS information attached) will only increase over time to include virtually all cell phone carriers. Accordingly, this cell phone coverage area information can be used as one of the parameters for route planning.

Road-Condition Preferences. Another user preference relates to road conditions. The U.S. National Weather Service has maps showing current weather conditions, near-term projected weather conditions and long term historical weather conditions for travelers across many parts of the United States. Some of this information is available with GPS information attached and more of this kind of information is becoming available in GPS format. In certain areas, certain roads are known to become impassable due to flooding conditions during heavy rains. In other areas, such as the Great Lakes and certain areas along the coasts, certain bridges are closed due to high wind and/or high wave conditions and/or flood tide conditions. In such instances, a traveler may need to take an inland route that avoids bridges or the areas where flooding may occur. Similarly, snow conditions in mountains often closes various mountain passes. At times, alternate routes are available around those mountain passes. Again, the U.S. Weather Service provides information pertinent to such snow conditions. One aspect of our invention is to take such GPS-based weather reports and factor it into routes recommended by the navigation system.

"Scenic" Route Preferences. Another user preference which applies to those who travel by automobile is a desire, on occasion, to take the "scenic" route versus the most direct route. For example, visitors from out of state and other countries are often picked up at a local airport and thereafter driven to another more distinct location, such as an office, a customer site, a local conference center or a resort. During a trip from the airport to such locations, the driver may deliberately wish to take a more "scenic" route so that the visitor will have a more complete impression of the diverse aspects of the local area than if the most direct but scenically "boring" route were taken. Some electronic map information available on DVD-based map systems or some available on the Internet presently indicate "scenic" routes. This scenic route information can be used by the GPS route planning software.

One aspect of the systems and methods of the present invention is to include such preference information in the route planning information provided in an agenda table. In this manner, the route planning software of the GPS system can take these preference into account automatically. For example, in the agenda table there can be a further column in which the preferences are put based upon priority. The preferences could be appropriately coded, such as the following: "F" for fastest route, "S" for scenic route; "CC" for "continuous cell" phone coverage route; "W" for the route most likely to have hazardous weather conditions (such as high winds, snow, flooding, etc.); "EO" for "expressways only" for a route that has the least number of traffic lights and which selects the expressways in preference to business routes through town; "NE" for "no expressways" routes (which a driver might select when he or she does not like driving on higher speed roads); and "NC" for "no congestion" meaning those routes which are likely to have the least traffic congestion and/or stop-and-go traffic conditions. These and still other user preferences which are available can all be utilized by route planning software. Importantly, we recognize, as part of the present invention, that this preference information should be information that can be entered into agenda replicator system, where it can be looked at and an agenda finalized before the agenda table with such preference information is loaded into the actual vehicle-based navigation system with route-planning capabilities.

As shown in FIG. 2, the GPS Agenda Table 200 is a data structure which contains an agenda portion 210 which contains agenda items 221-227, an estimated time to the destination portion 230 which contains estimated times to destination 231-237, and a route description portion 240 which contains routes 241-247 which are generated by route planning software. Thus each agenda item, 221-227, has a corresponding estimated time to destination, 231-237, and a corresponding route, 241-247. An agenda item 221-227 minimally contains an appointment time, i.e., the time at which the user desires to arrive at the location, and an identifier or descriptor that describes the location. This identifier or descriptor can be an address or the name of the party whom the user is meeting. The time to destination 230 is dynamically computed by the route planning software. The route planning software can either use a factor which is based on the time of day to take into account variations in traffic patterns and congestion and the expected time to complete the route or the route planning software GPS uses the time to travel the distance and the amount of traffic on the route, as determined by website or radio transmissions. If the agenda item contains a descriptor rather than an address, the system will search for the address associated with the descriptor by searching through the user's address book and the Internet, if necessary. The time to destination 231-237 is updated dynamically whenever the GPS Agenda Table is accessed.

The invention contemplates that an agenda will be created on a computer system such as a desktop computer, laptop computer or a personal data assistant (PDA) or the like, which is separate from a vehicle-based computer system. For ease of reference this computer system that is independent of the vehicle's computer system will be referred to as the office-based computer system. An agenda is a list of destinations to which a user of the agenda replicator system wishes to travel and which would typically be arranged in an order that corresponds to the order in which the user wishes to travel to the various locations. The items that are listed in the agenda can be abstracted from the user's calendar. A calendar is typically a component of personal information management systems, as is well-known by those skilled in the art.

FIG. 2 describes a GPS Agenda Table 240 that is generated from items that the user selects from his calendar. This GPS Agenda Table 240 is stored in the first computer system and is then replicated on a vehicle-based computer system. The GPS Agenda Table that is stored within the vehicle-based system will be referred to as the Vehicle-Based GPS Agenda Table whereas the GPS Agenda Table that is stored within the office-based computer or a PDA will be referred to as the Office-Based GPS Agenda Table.

Figure 3:
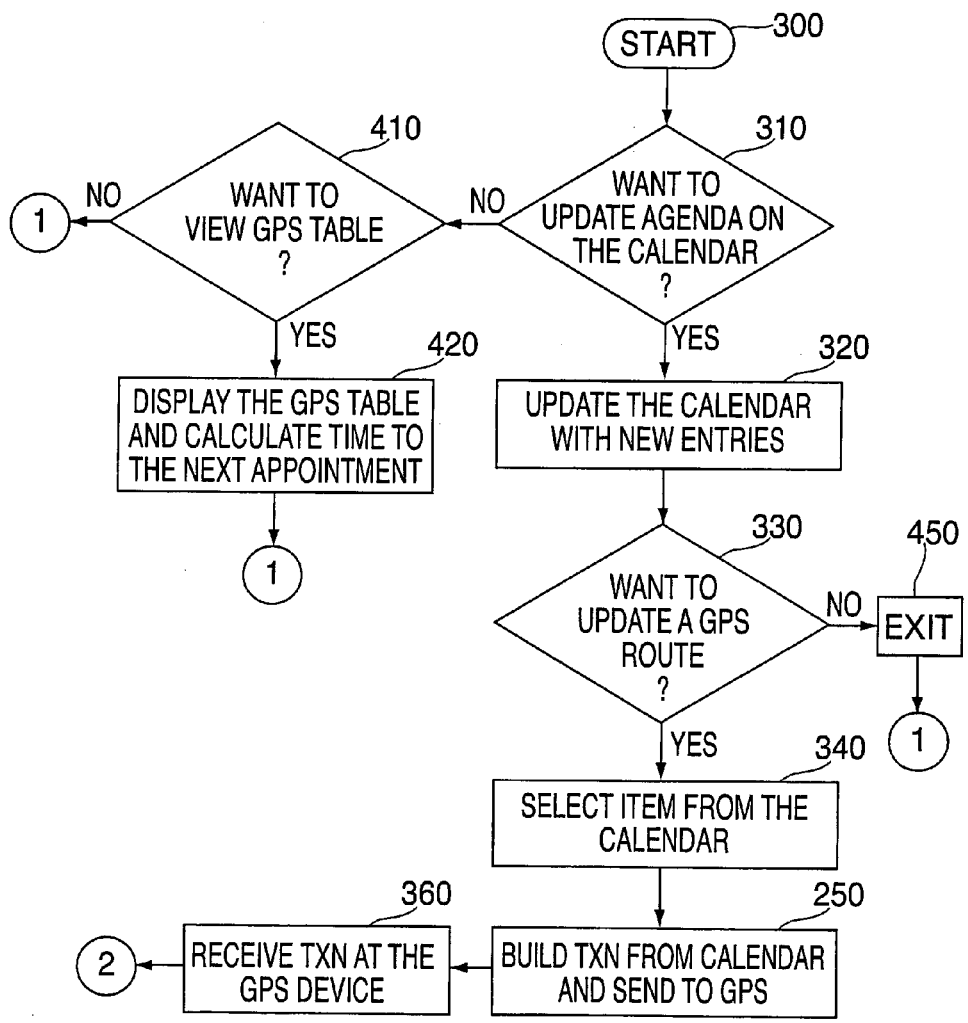
FIG. 3 is a flow chart to help show steps in the process of creating an agenda table from entries in an electronic calendar of the type a user may have in a personal information management system.

As shown in FIG. 3, the process of 300 of replicating the agenda begins with the calendar. The calendar is a standard part of any personal information management system. The process begins by determining whether new agenda items need to be added to the user's calendar or whether entries on the calendar need to be updated as shown in decision box 310. If the agenda needs to be updated, then new entries are then added to the calendar as shown in block 320. The system then queries the user to see if the user wants to update a GPS route 240 for any new items added as shown in decision box 330. If the user indicates that the GPS route is to be updated, the user can select an agenda item from the calendar as shown in box 340. The agenda item can be a single entry in the calendar, a day of entries, a week of entries or any group of entries. If the user does not wish to update the GPS route, then the process of establishing GPS Agenda Table 200 has been completed and the method exits as shown in block 450.

As part of the updating process shown in box 320, the user may delete an item from the calendar or may change an item in the calendar. If there was an entry in the GPS Agenda Table 200 corresponding to that agenda item, then that route information for that changed or removed entry is also deleted. Typically, after deleting an item, the user would choose to update the routes of any remaining items affected by such a deletion. If the user changes the information in a calendar item, the user would choose to update the route associated with such an item and any other items that were affected. For instance, if the first destination to which the user had intended to travel on a particular day is deleted, the user would need to update the routes for the remaining destinations to which he had planned to travel that day.

Once an agenda item from the calendar has been selected for updating, the next step is to build a transaction from the calendar and send it to the GPS device as shown in block 350. The transaction consists of a transaction identifier which indicates which calendar items are included and must be updated on the GPS Agenda Table, the address of the GPS device that contains the GPS agenda table, the sending address and the list or agenda items from the calendar. The transaction is then sent to the GPS device as shown in block 360 either using a direct link between the two devices such as a cable, an optical link, over the Internet, or using wireless technology.

If upon initiation of the process depicted in FIG. 3, the user does not want to update the agenda, then the system determines whether the user wants to view the GPS Agenda Table as shown in block 410. If the user does not wish to view the GPS Agenda Table, then the process exits as shown by the path between decision block 410 and block 450. The GPS Agenda Table is displayed to the user as shown in block 420. Prior to displaying the GPS Agenda Table to the user, the process recalculates all of the estimated times to destination. After the GPS Agenda Table is displayed to the user, the process exits as shown by the path between block 420 and block 450.

Figure 4:
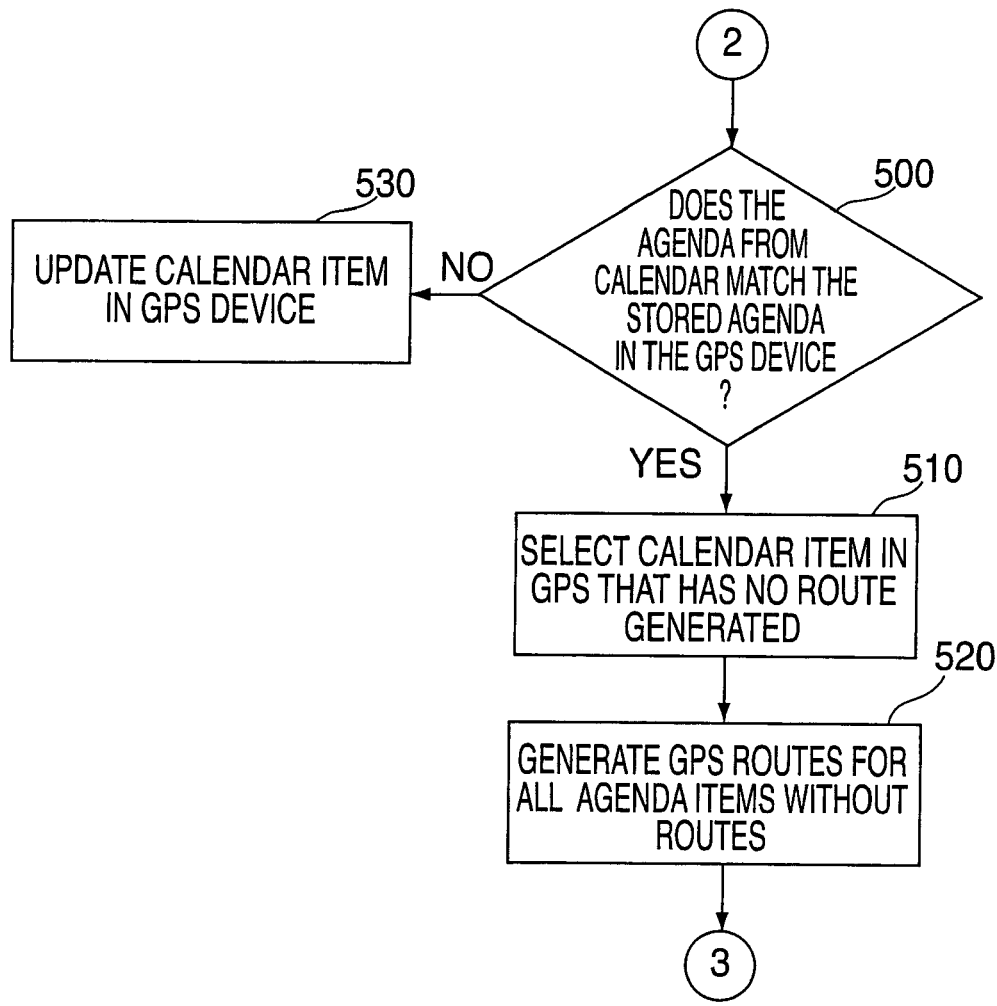
FIG. 4 is a flow chart helping illustrate various steps associated with updating the GPS agenda table.

FIG. 4 depicts the method of replicating the GPS agenda table created from the calendar on the vehicle-based system which includes a GPS navigation system with route planning software, which will at times be called a GPS device. The destination and the requested time of arrival are used as input to the GPS device. The process of agenda replication starts by determining whether the GPS agenda table created from the calendar matches the agenda stored in the vehicle-based GPS device as shown in decision diamond 500. If there is not a match, then the calendar item in the GPS Device is updated with the agenda information from the calendar item in the office-based agenda replicator system as shown in block 530. Once the agenda stored in the vehicle-based GPS device matches the agenda table from the user's calendar, then the process selects all items in the GPS agenda table that do not have any route information generated as shown in block 510. Then, the GPS device generates routes for all agenda items that did not have a route as shown in block 520. The agenda replication process is completed at this point.

The agenda replicator system of the present invention may, as previously described reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of Agenda Replicator Software. To implement the agenda replicator systems and methods of the present invention, process software, which is composed of the software as described above and related components including any needed data structures, is written and then if desired, integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of same with reference to the flowcharts of FIGS. 5 and 6.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems are identified and compared to the list of operating systems, version numbers and network software that have been tested to work with the process software. Those operating systems, version numbers and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of same should be readily understood.

Figure 5:
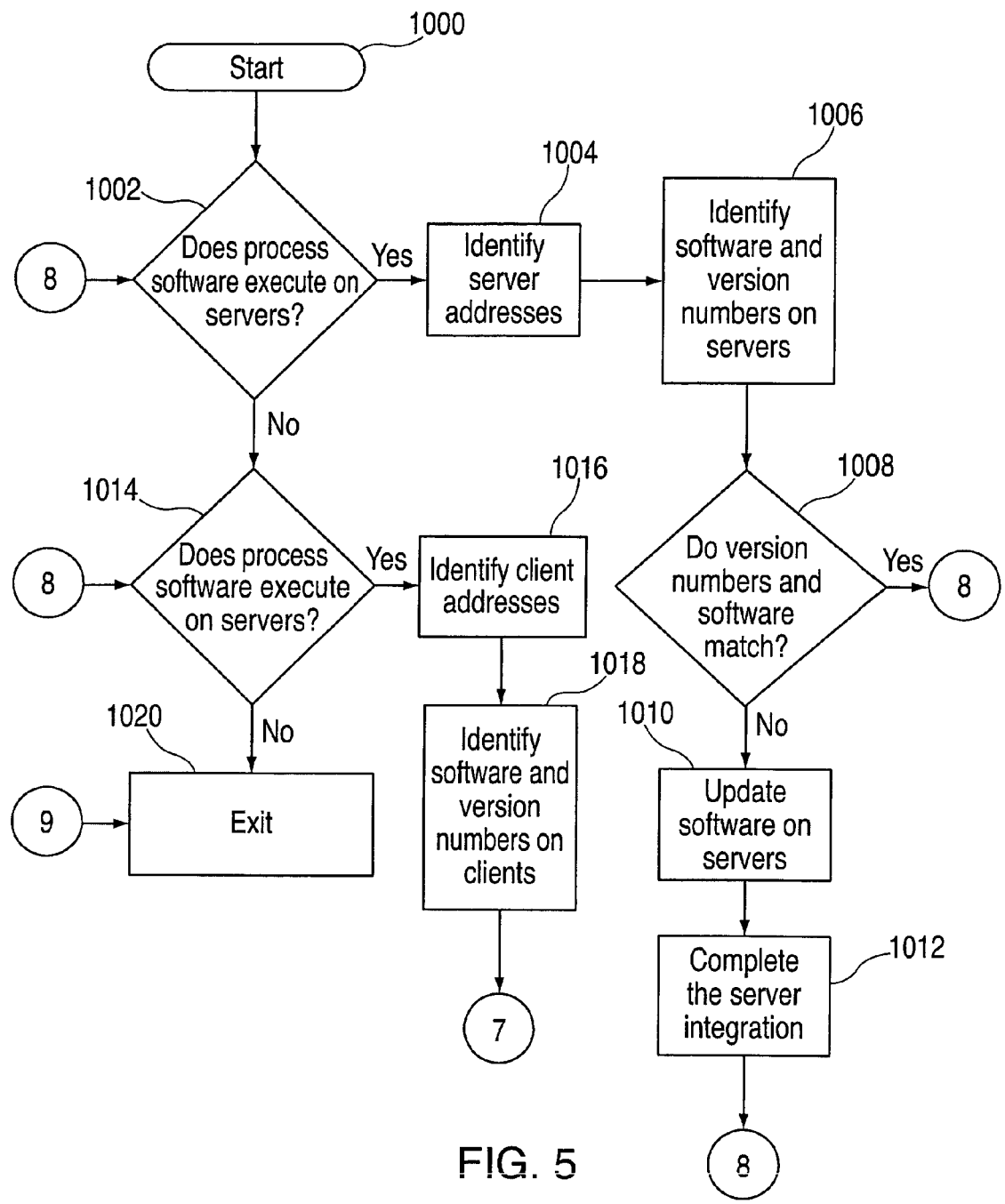
FIGS. 5 through 13 are flowcharts, where
Figure 6:
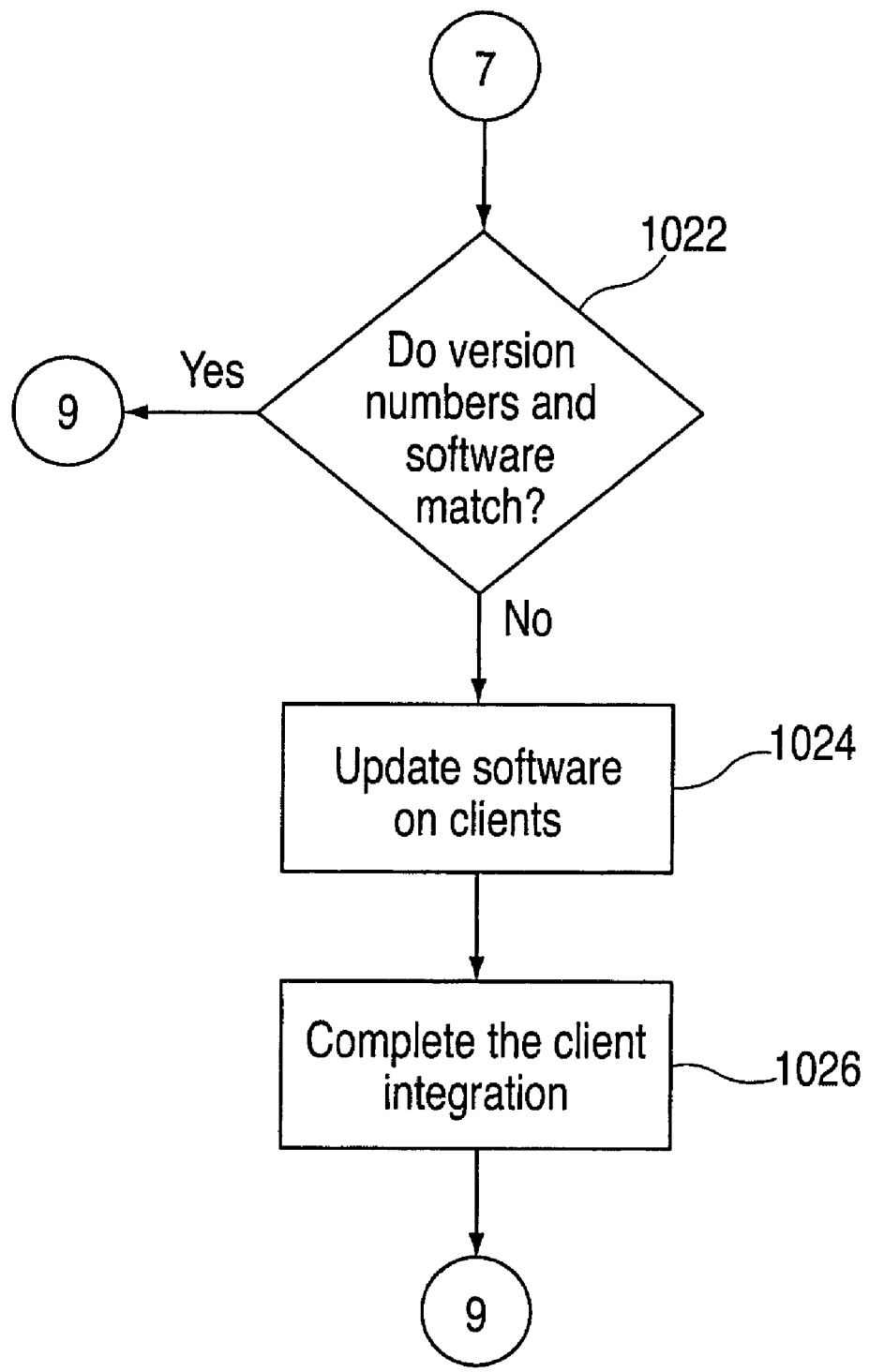

Referring to FIGS. 5 and 6, step 1000 begins the integration of the process software for implementing the agenda replicator systems and methods of the present invention. The first thing is to determine if there are any process software programs that will execute on a server or servers, as shown in box 1002. If this is not the case, then integration proceeds to determine if the process software will execute on clients as shown in box 1014. If this is the case, then the server addresses are identified as shown in box 1004. The servers are checked to see if they contain software that includes the operating system (OS), applications, and network operating systems (NOS), together with their version numbers, that have been tested with the process software as shown in box 1006. The servers are also checked to determine if there is any missing software that is required by the process software as part of the activity at box 1006. A determination is made if the version numbers match the version numbers of OS, applications and NOS that have been tested with the process software as shown in box 1008. If all of the versions match and there is no missing required software the integration continues at box 1014. If one or more of the version numbers do not match, then the unmatched versions are updated on the server or servers with the correct versions as shown in box 1010. Additionally if there is missing required software, then it is updated on the server or servers as shown in box 1010. The server integration is completed by installing the process software as shown in box 1012.

Step 1014, which follows either step 1002, 1008 or 1012, determines if there are any programs of the process software that will execute on the clients. If no process software programs execute on the clients, the integration proceeds to box or step 1020 and exits. If this not the case, then the client addresses are identified at box 1016.

At box 1018, the clients are checked to see if they contain software that includes the operating system (OS), applications, and network operating systems (NOS) software, together with their version numbers, that have been tested with the process software. The clients are also checked at box 1018 to determine if there is any missing software that is required by the process software.

At box 1022, a determination is made if the version numbers match the version numbers of OS, applications and NOS that have been tested with the process software. If all of the versions match and there is no missing required software, then the integration proceeds to box 1020 and exits.

If one or more of the version numbers do not match, then the unmatched versions are updated on the clients with the correct versions at box or step 1024. In addition, if there is missing required software then it is updated on the clients as part of box 1024. The client integration is completed by installing the process software on the clients at box 1026. The integration proceeds to box 1020 and exits.

Deployment of Agenda Replicator Software. It should be well-understood that the process software for implementing the agenda replicator of the present invention may be deployed by manually loading the process software directly into the client, server and proxy computers from a suitable storage medium such as a CD, DVD, etc. It is useful to provide an overview of still other ways in which the process software may also be automatically or semi-automatically deployed into one or more computer systems. The process software may so deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of same with reference to FIGS. 7 and 8, where the deployment processes are illustrated, will be more easily understood.

Step 1050 begins the deployment of the process software. The first thing at decision box 1052 is to determine if there are any programs that will reside on a server or servers when the process software is executed. If the answer is "yes", then the servers that will contain the executables are identified, as indicated at box 1088 in FIG. 8. The process software for the server or servers is transferred directly to the servers' storage via FTP or some other protocol or by copying though the use of a shared file system at box 1090. The process software is then installed on the servers as indicated at box 1092.

Figure 7:
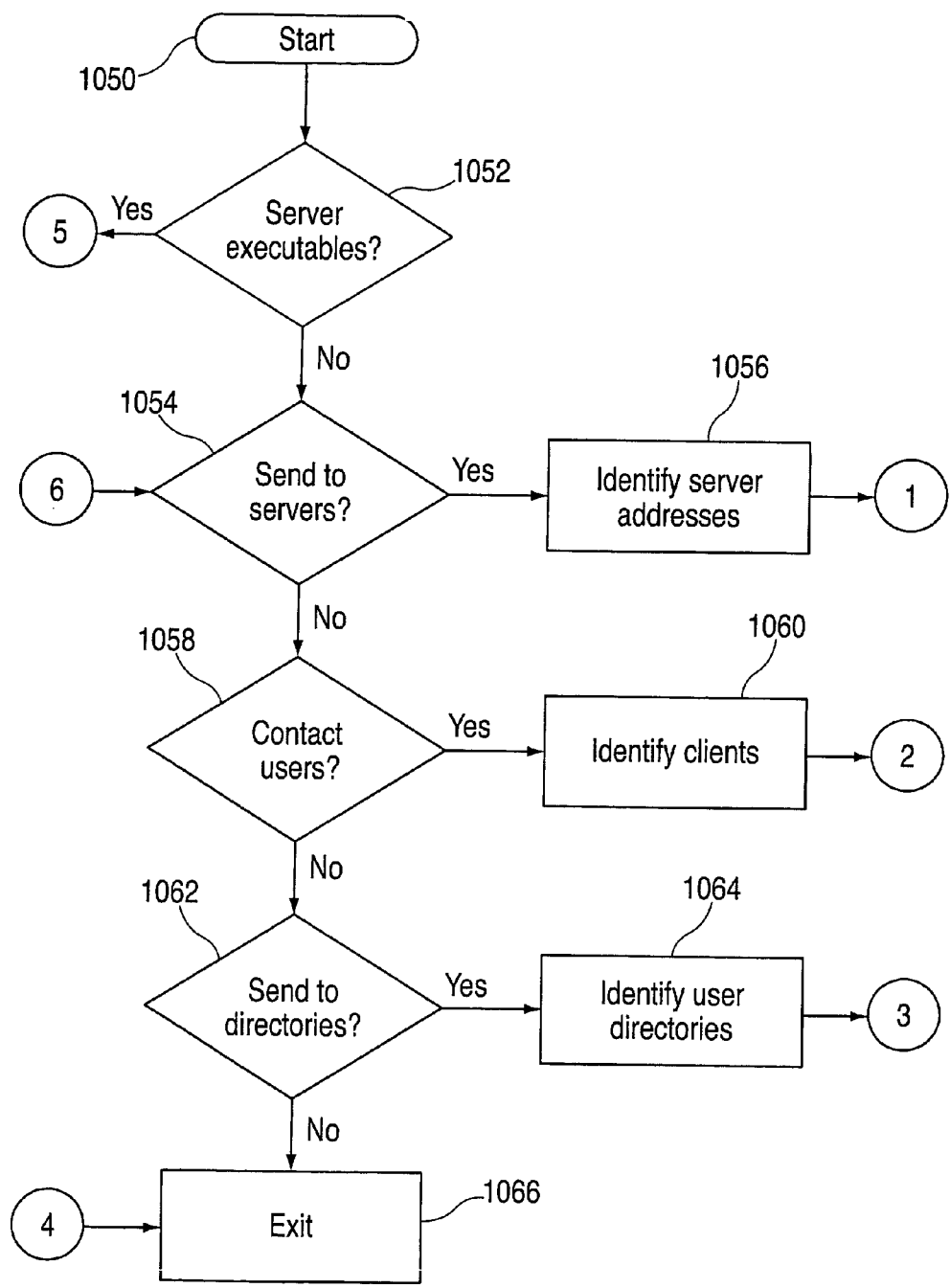
Figure 8:
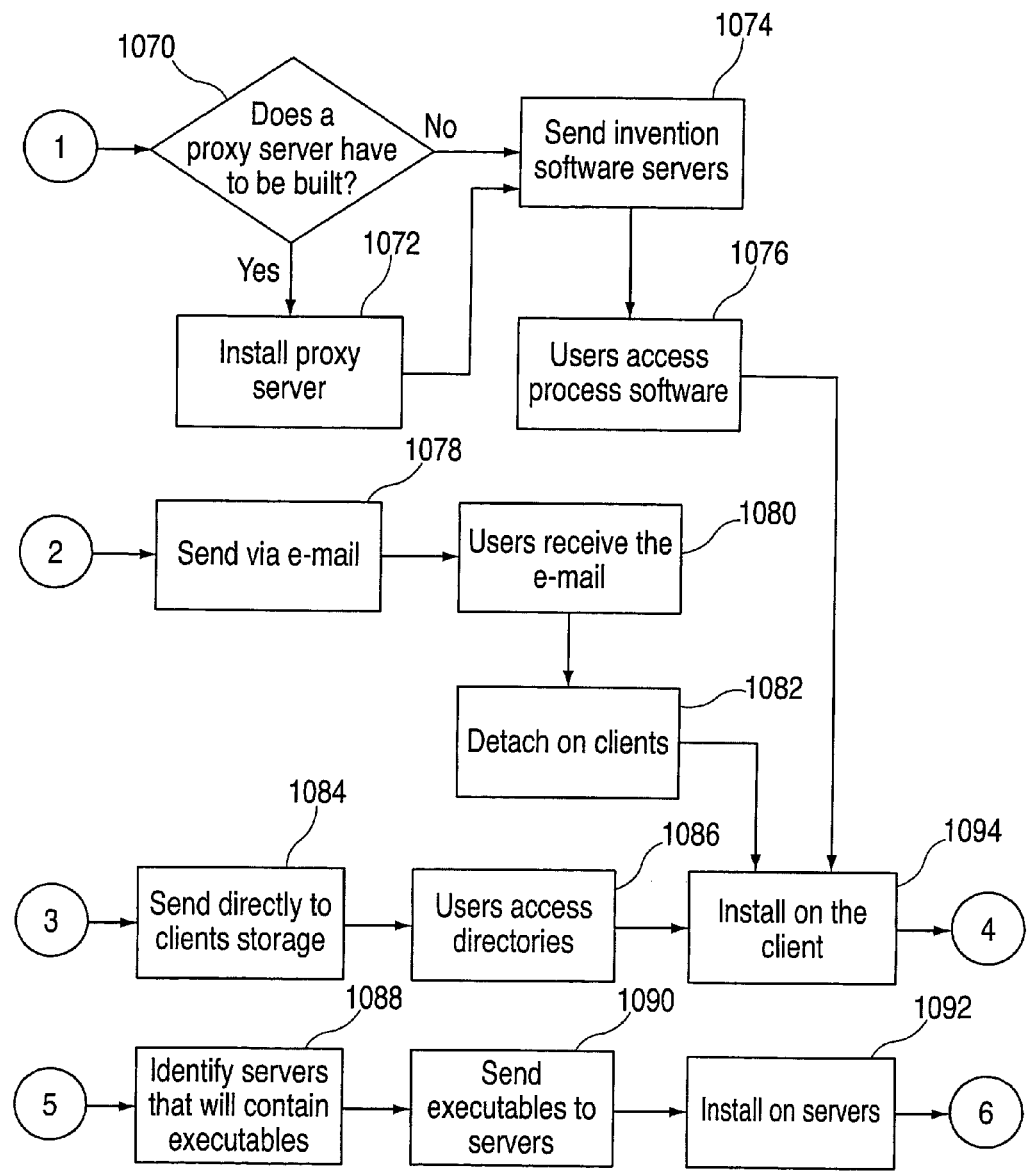

Next, as shown at decision box 1054 in FIG. 7, a determination is made on whether the process software is to be deployed by having users access the process software on a server or servers. If the users are to access the process software on servers, then the server addresses that will store the process software are identified as indicated at box 1056.

Next, as shown at decision box 1070, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at box 1072. Next, the process software for implementing the present invention is sent to the servers, as indicated in box 1074 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers, as indicated at box 1076. Another alternative is to have the servers automatically copy the process software to each client and then run the installation program for the process software at each client computer. Either way, as indicated at box 1094, the user computer executes or causes to be executed the program that installs the process software on the client computer, then the process exits at box 1066.

Continuing now at decision diamond 1058 in FIG. 7, a determination is made as to whether the process software is to be deployed by sending the process software to users via e-mail. If the answer is yes, then, as indicated at box 1060, the set of users where the process software will be deployed are identified together with the addresses of the user client computers. The process software is sent via e-mail in step 1078 (shown in FIG. 8) to each of the users' client computers. Then, as indicated in box 1080 the users then receive the e-mail, and then detach the process software from the e-mail to a directory on their client computers as indicated in box 1082. The user then executes the program that installs the process software on his client computer as indicated at box 1094, and then exits the process at box 1066.

Continuing at decision diamond 1062 (see bottom of FIG. 7), a determination is made on whether to the process software will be sent directly to user directories on their client computers. If so, the user directories are identified, as indicated at box 1064. Then, the process software is transferred directly to the identified directory on user's client computer, as indicated in box 1084. This can be done in several ways such as but not limited to sharing of the file system directories and then copying from the sender's file system to the recipient user's file system or alternatively using a transfer protocol such as File Transfer Protocol (FTP). Next, the users access the directories on their client file systems, as indicated in box 1086, in preparation for installing the process software. Finally, the user executes the program that installs the process software on his client computer as indicated in box 1094 and then exits the process at box 1066.

Use of Virtual Private Networks for Agenda Replicator Software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee(s). Access to the software via a VPN can be provided as a service by specifically constructing the VPN for purposes of delivery or execution of the process software (i.e. the software resides elsewhere). In such instance, the lifetime of the VPN is often limited to a given period of time or to a given number of deployments based on an amount paid.

The process software may be deployed, accessed and executed through either a remote-access VPN or a site-to-site VPN. When using a remote-access VPN, the process software is typically deployed, accessed and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL or wireless modem to reach the NAS and use their VPN client software to access the corporate network and to access, download and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

Figure 10:
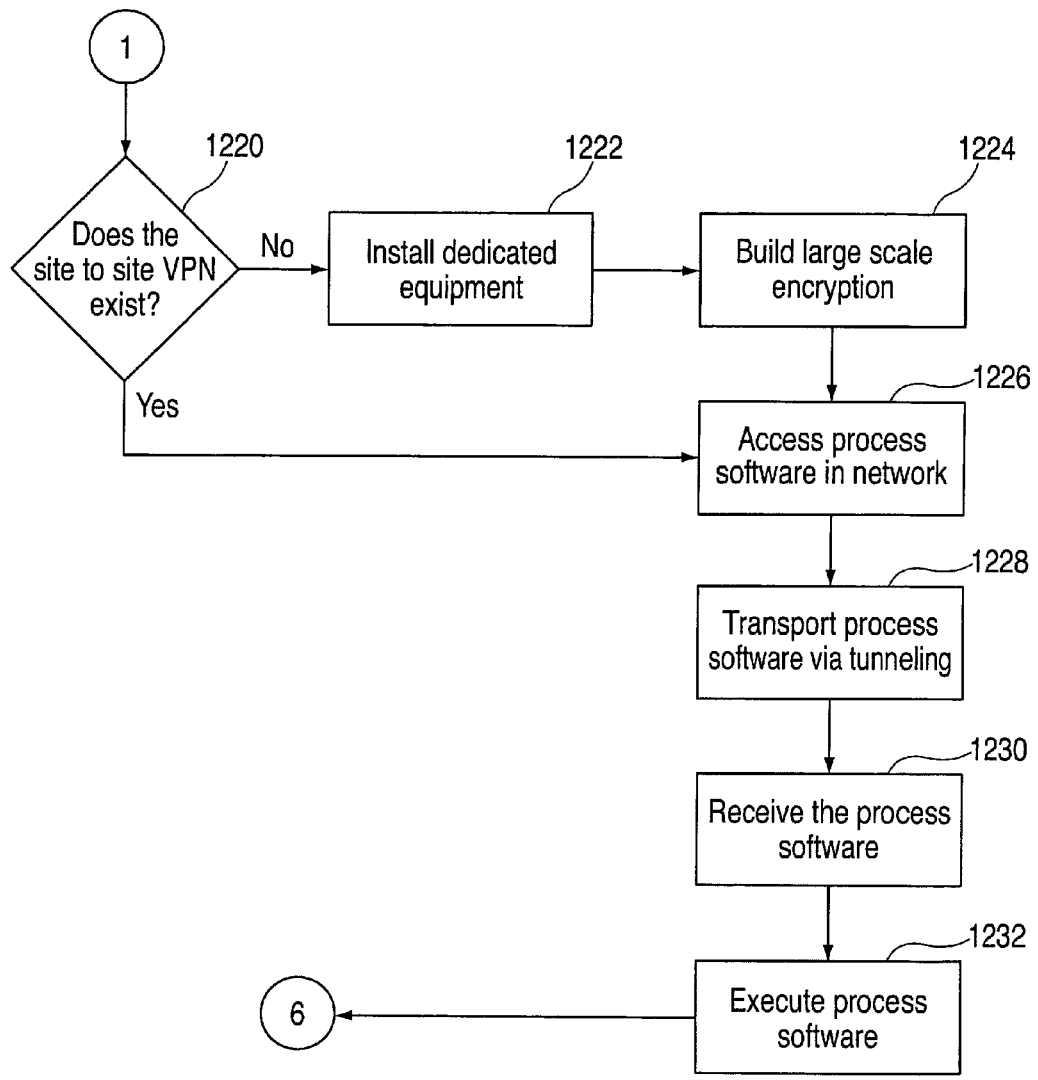
Figure 11:
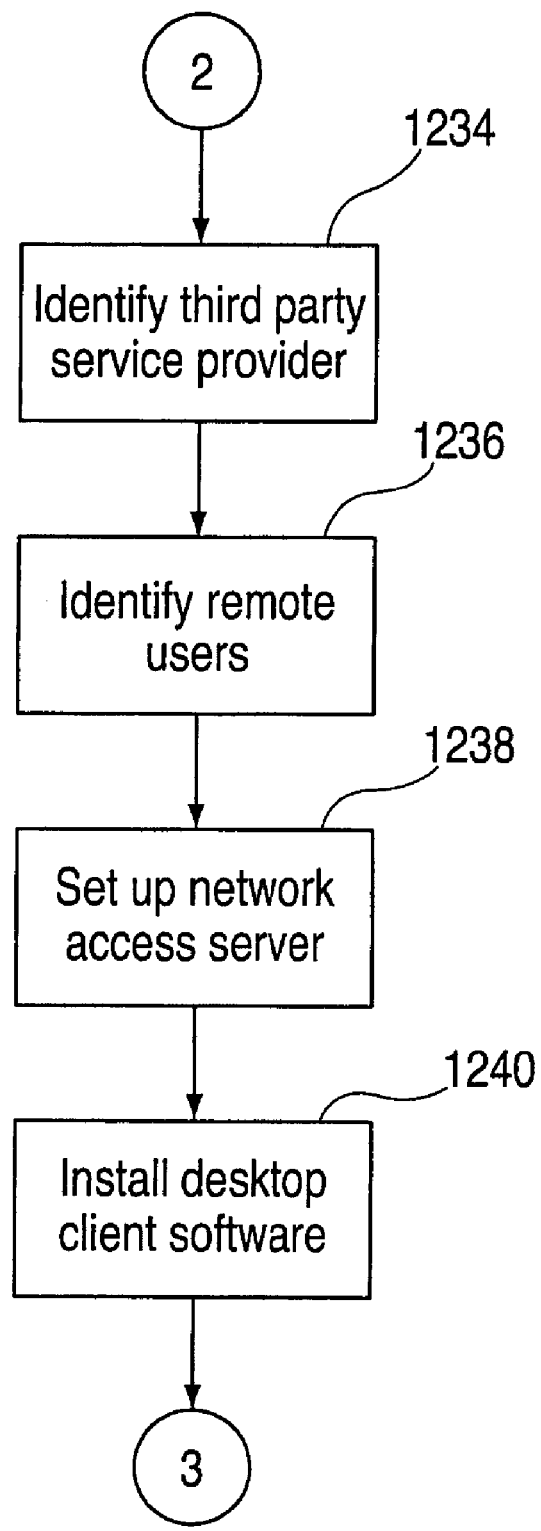

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 9 through 11 should be more readily understood.

Figure 9:
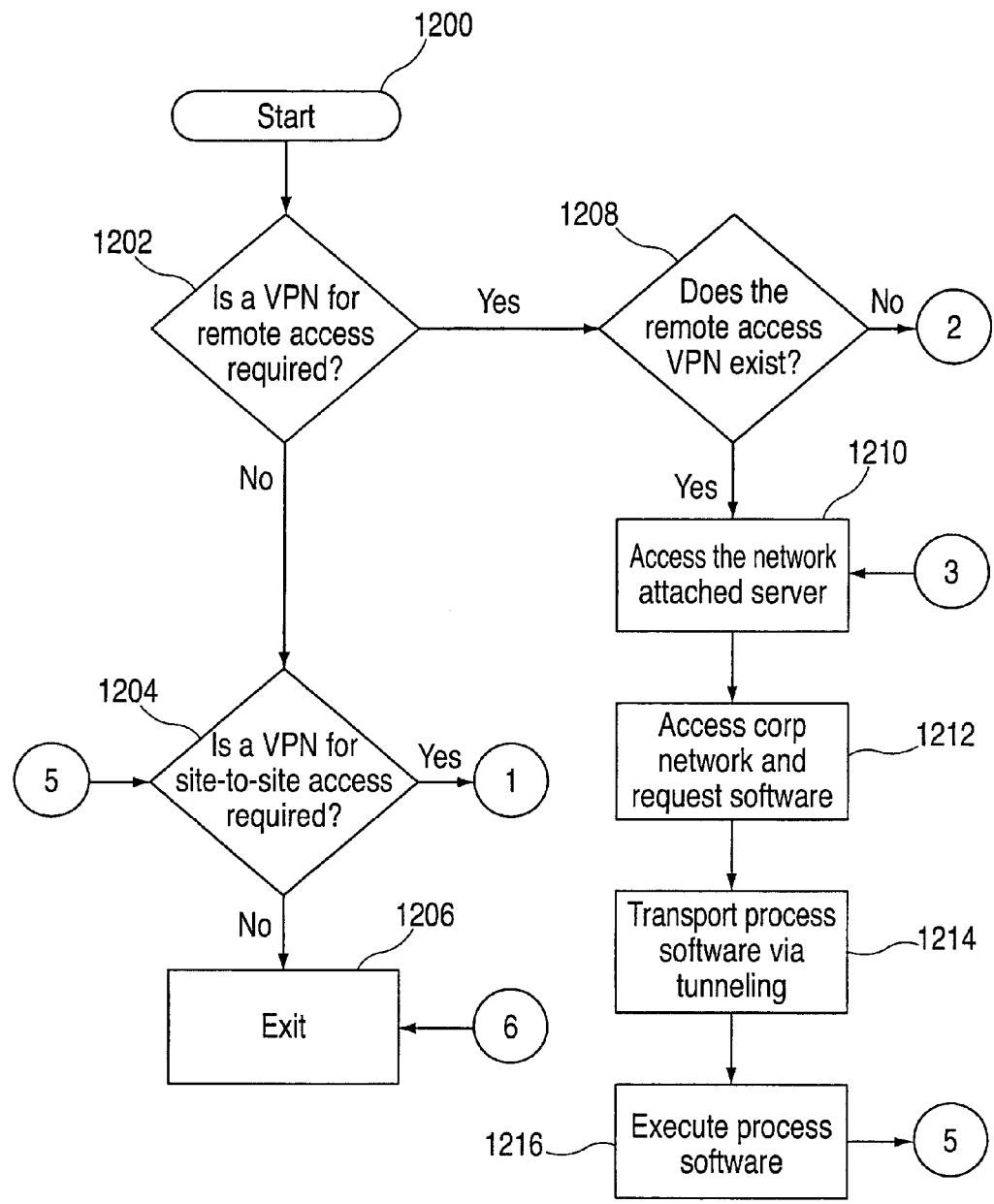

Step 1200 in FIG. 9 begins the virtual private network (VPN) process. A determination is made at decision box 1202 to see if a VPN for remote access is required. If it is not required, then flow proceeds to decision box 1204. If it is required, then flow proceeds to box 1208 where a determination is made if as to whether a remote access VPN exists that is available for use.

If a remote access VPN does exist, then flow proceeds to box 1210 in FIG. 7. Otherwise flow proceeds to box 1234 (see top of FIG. 11), where a third party provider that will provide the secure, encrypted connections between the company's private network and the company's remote users is identified. Next, as indicated in box 1236, the company's remote users are identified. Then, as indicated at box 1238, identified third party provider then sets up a network access server (NAS). The NAS allows the remote users to dial a phone number (typically a toll free number) or attach directly via a cable, DSL, wireless or other modem to access, download and install the desktop client software for the remote-access VPN as indicated at box 1240.

Returning to box 1210 in FIG. 9, after the remote access VPN has been built or if it been previously installed, the remote users can then access the process software by dialing into the NAS or attaching directly via a cable, DSL or other modem into the NAS. This step at box 1210 allows entry into the corporate network, as indicated at box 1212, where the process software may be accessed. The process software is transported to the remote user's desktop computer over the network via tunneling. During tunneling, see box 1214, the process software is divided into packets and each packet including the data and protocol for that packet, is placed within another packet. When the process software arrives at the remote user's desktop computer, it is removed from the packets, reconstituted and then may be executed on the remote users desktop, as indicated at box 1216.

Returning now to decision diamond 1204 in FIG. 9, a determination is made to see if a VPN for site-to-site access is required. If it is not required, then flow proceeds to the exit at box 1206. If it is required, flow proceeds to box decision diamond 1220 (see top of FIG. 8) to determine if the site-to-site VPN exists. If it does exist, then flow proceeds to box 1226. If it does not exist, then as indicated at box 1222, dedicated equipment required to establish a site-to-site VPN is installed. Then build the large scale encryption into the VPN 1224.

After the site-to-site VPN has been built or if it had been previously established, the users access the process software via the VPN as indicated in box 1226. Next, the process software is transported to the site users over the network via tunneling as indicated in box 1228. As previously explained, the process software is divided into packets and each packet including the data and protocol is placed within another packet, as indicated in box 1230. When the process software arrives at the remote user's desktop, it is removed from the packets, reconstituted and is executed on the site users desktop 1232. Then the process proceeds to box 1206 and exits.

Figure 12:
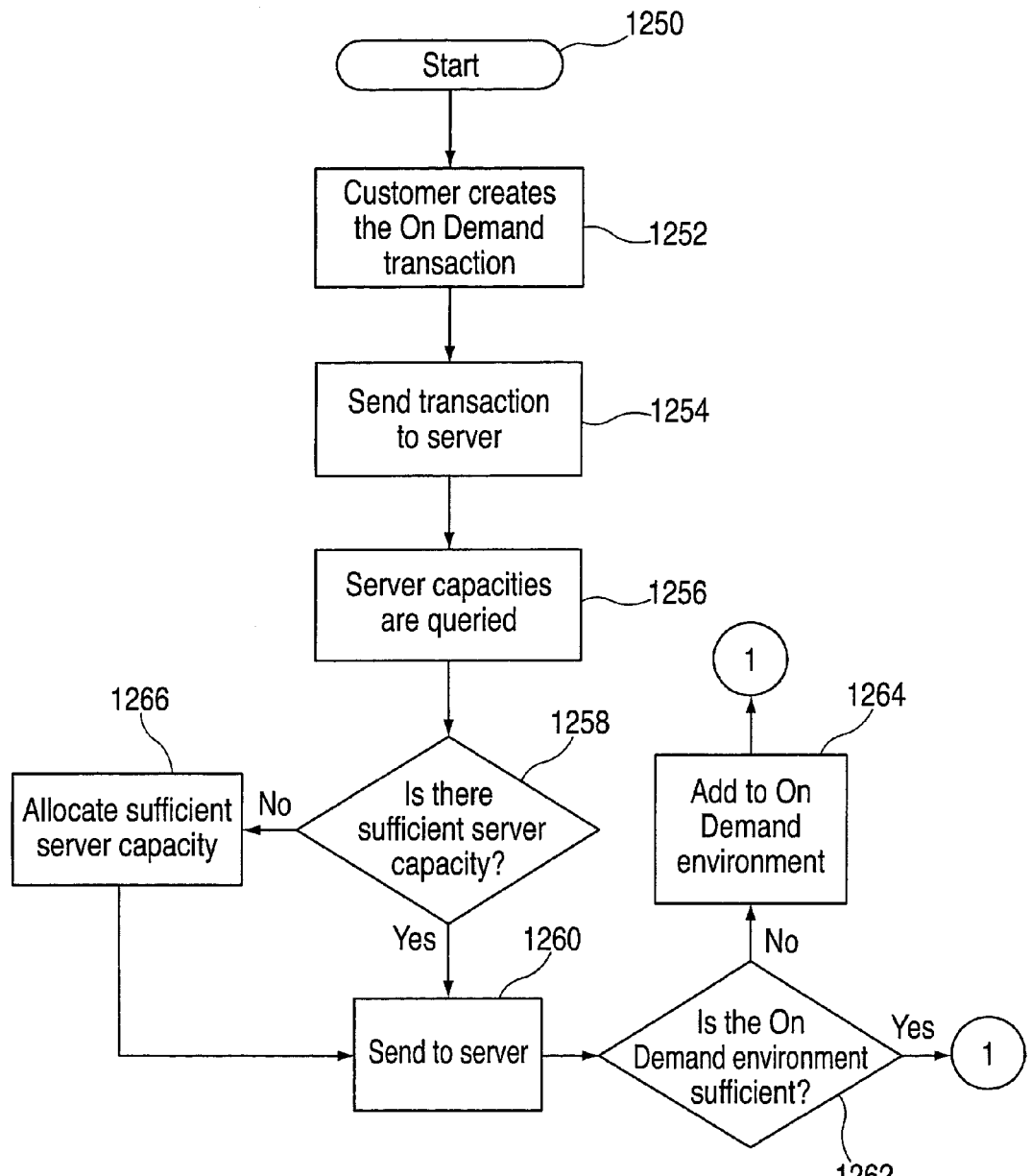
Figure 13:
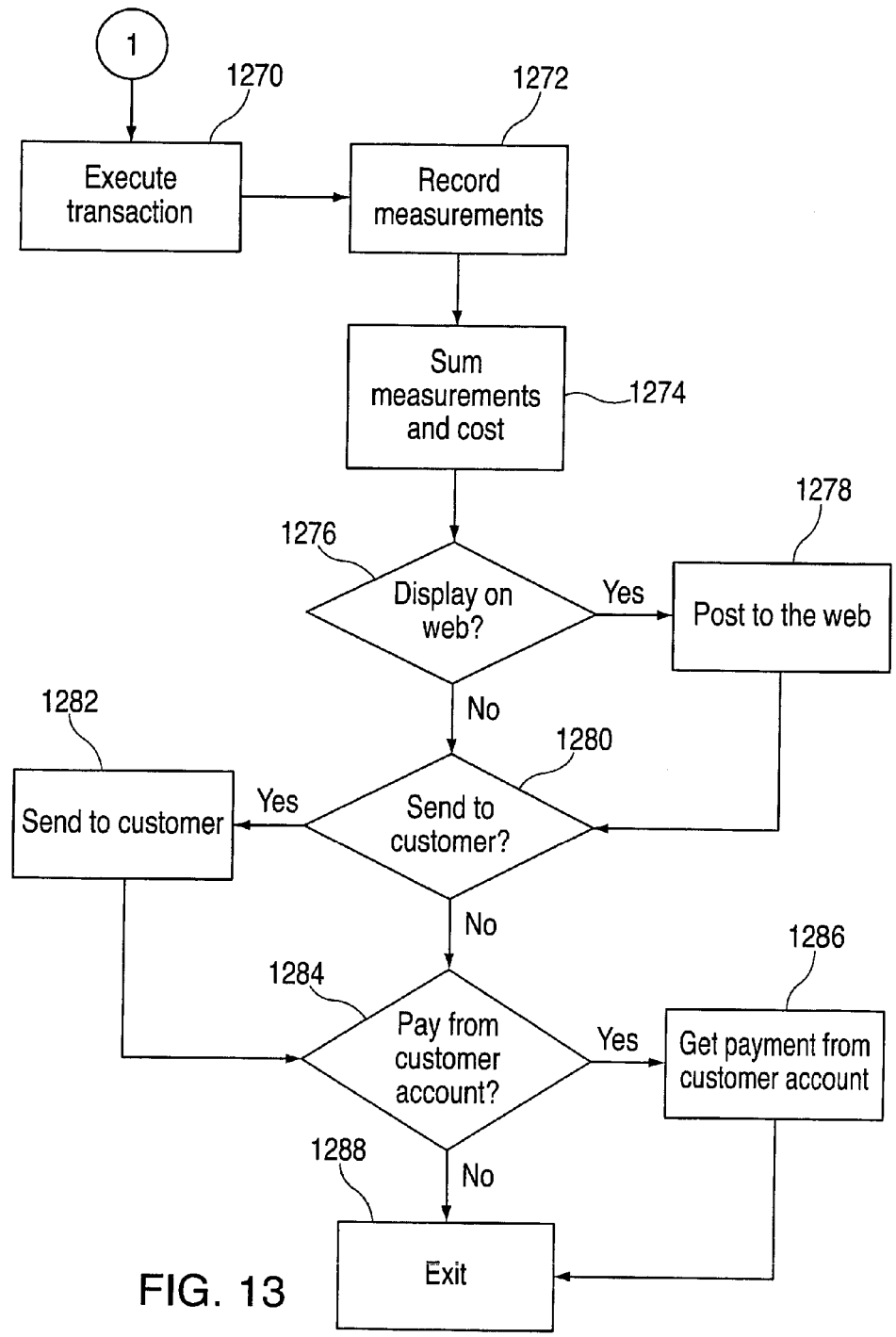

On Demand Computing for Agenda Replicator Software. The process software for implementing the agenda replicator of the present invention may be shared, that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the agenda replicator software will now be provided, followed by a more detailed description of same made with reference to the flowcharts of FIGS. 12 and 13.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, the following detailed description of same with reference to FIGS. 12 and 13, where the on demand processes are illustrated, will be more easily understood.

Step 1250 begins the On Demand process. A transaction is created than contains the unique customer identification, the requested service type and any service parameters that further specify the type of service as indicated in box 1252. The transaction is then sent to the main server as shown in box 1254. In an On Demand environment the main server can initially be the only server, then as capacity is consumed other servers are added to the On Demand environment.

The server central processing unit (CPU) capacities in the On Demand environment are queried as indicated in box 1256. The CPU requirement of the transaction is estimated, then the servers available CPU capacity in the On Demand environment are compared to the transaction CPU requirement to see if there is sufficient CPU available capacity in any server to process the transaction as indicated in decision box 1258. If there is not sufficient server CPU available capacity, then additional server CPU capacity is allocated to process the transaction as indicated in box 1266. If there was already sufficient Available CPU capacity then the transaction is sent to a selected server as indicated in box 1260.

Before executing the transaction, a check is made of the remaining On Demand environment to determine if the environment has sufficient available capacity for processing the transaction as indicated in decision box 1262. This environment capacity consists of such things as but not limited to network bandwidth, processor memory, storage, etc. If there is not sufficient available capacity, then capacity will be added to the On Demand environment as indicated in box 1264. Next the required software to process the transaction is accessed, loaded into memory, then the transaction is executed as indicated in box 1270.

The usage measurements are recorded as indicated in box 1272. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer as indicated in box 1274.

If the customer has requested that the On Demand costs be posted to a web site as indicated in decision diamond 1276, then they are posted to a web site as indicated in box 1278. If the customer has requested that the On Demand costs be sent via e-mail to a customer address as indicated in decision diamond 1280, then they are sent to the customer via e-mail as indicated in box 1282. If the customer has requested that the On Demand costs be paid directly from a customer account as indicated in decision diamond 1284 then payment is received directly from the customer account as indicated in box 1286. The On Demand process proceeds to box 1288 and then exits.

The systems and methods of the present invention need not be further described here since those skilled in the art, based on the teachings of the present invention, will readily understand how to implement the same. This in part is due to the widespread use of conventional automatic data recovery software and management tools in large computer systems in order to provide for a more graceful recovery from server failures and other sources of partial or total abnormal terminations. Any suitable programming approaches and/or other well-known protocols and tools familiar to those writing operating system and management system programs and/or components, including those used in object-oriented distributed computing environments, may be used to help code the software required to implement the nested recovery scope management systems and methods of the present invention. For example, the systems and processes of the present invention may be written as programs or a set of interrelated routines in any suitable programming language, such as but not limited to an object-oriented language and then deployed to run under the control of any suitable management software package including an operating system if desired.

The present invention has been described in part by reference to block and flow diagrams and elements of systems and steps of methods. As is well known, suitable program instructions provided in software are used to turn general purpose computers and/or processors into programmed computers and/or processors to form systems capable of carrying out the teachings of the present invention.

Firmware & Other Implementations. It should be appreciated by those skilled in the art that if desired, the systems, methods and software described herein may be implemented in part in firmware (including microcode) or hardware. Accordingly, the present invention may take the form of an embodiment including hardware and/or firmware, or an embodiment that is a combination of software, hardware and/or firmware. Further, the methods of the present invention may be carried out entirely in software, or in a combination of the software, hardware and/or firmware.

Tangible Media as an Implementation. Also, the software or other coding employed to implement the present invention may be provided in any suitable form of computer program code embodied in tangible media, such as but not limited to floppy diskettes, CD-ROMs, hard drives, static or flash memory, gate arrays, or any other computer readable storage medium. When such computer program code or other code, containing the needed instructions, is loaded into and is ready for execution by suitable computers/processors, such programmed computers/processors become an apparatus for practicing the invention. Thus, it should be appreciated that another embodiment of the present invention is the computer program code needed for carrying out the processes of the present invention when it is embodied in a tangible medium.

Further Variations/Additions. The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

What is claimed is:

1. A method for transferring information from a portable agenda replication device to a vehicle navigation system, the method including:

accepting entry of an agenda comprising a destination and a requested time of arrival at the destination;

storing the agenda in a computer readable storage mechanism;

retrieving the agenda from the storage mechanism;

transmitting the retrieved agenda to the vehicle navigation system, and instructing the vehicle navigation system to use the agenda to determine a route to follow to the destination based upon the requested time of arrival, and also based upon at least one of: (a) a cellphone coverage preference, (b) a road condition preference, or (c) a scenic route preference; and using the portable agenda replication device to update the agenda in the middle of a multiple-stop trip by determining whether a travel agenda table stored in the vehicle navigation system matches that stored in the portable agenda replication device and, in the event there is not a match, updating a calendar item in the vehicle navigation system with agenda information from a calendar item in the portable agenda replication device and, once a determination is made that the agenda information in the vehicle navigation system matches the information stored in the portable agenda replication device, selecting all items in the travel agenda table stored in the vehicle navigation system that do not have a calculated route associated therewith;

wherein, when a location is dropped from the agenda or a new entry is added to the agenda, the route is automatically recalculated by the vehicle navigation system in response to the vehicle navigation system receiving the updated agenda from the portable agenda replication device.

2. The method of claim 1 further comprising:
storing personal preference information associated with the destination; the personal preference information comprising at leastone of a date of departure, a desired time of departure, a cell phone preference, a scenic route preference, a toll road preference, and an express route preference.

3. The method of claim 1 further comprising:
storing personal preference information associated with the destination; the personal preference information comprising at least one of a date of departure, a desired time of departure, a cell phone preference, a scenic route preference, a toll road preference, and an express route preference.

4. The method of claim 1 further comprising displaying at least a portion of the agenda on a display unit associated with the vehicle navigation system.

5. The method of claim 4 wherein displaying further comprises displaying at least a first portion of a planned route between a current location of the vehicle navigation system and the destination.

6. The method of claim 1 wherein the agenda comprises a first desired destination; a requested time of arrival at the first desired destination, a second desired destination and a requested time of arrival at the second desired destination.

7. The method of claim 1 wherein information is transferred from the portable agenda replication device to the vehicle navigation system over a communications path comprising a wireless communications link including at least one of (a) a short-range optical connection between a first transmitter receiver associated with the portable agenda replication device and a second transmitter receiver associated with the vehicle navigation system, or (b) a wireless connection between a first RF transmitter receiver associated with the portable agenda replication device and a second RF transmitter receiver associated with the vehicle-navigation system.

8. The method of claim 7 wherein the wireless communications link is a radio frequency link selected from the group of radio frequency links consisting of short-range low-power communication links and long-range cell phone-based communication links.

9. The method of claim 1 wherein the portable agenda replication device is a portable battery-powered computer system that is sufficiently light in weight to be carried by hand.

* * * * *